United States Patent
Kang

(10) Patent No.: US 9,522,647 B2
(45) Date of Patent: Dec. 20, 2016

(54) DRIVER AIRBAG STRUCTURE

(71) Applicant: Hyundai Mobis Co., Ltd., Seoul (KR)

(72) Inventor: Jeong Hoon Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/844,386

(22) Filed: Sep. 3, 2015

(65) Prior Publication Data

US 2016/0152205 A1    Jun. 2, 2016

(30) Foreign Application Priority Data

Dec. 1, 2014    (KR) .................. 10-2014-0169538

(51) Int. Cl.
B60R 21/231    (2011.01)

(52) U.S. Cl.
CPC .... B60R 21/231 (2013.01); *B60R 2021/23123* (2013.01)

(58) Field of Classification Search
CPC ...... B60R 21/231; B60R 21/20; B60R 21/237; B60R 2021/23123
See application file for complete search history.

(56) References Cited

U.S. PATENT DOCUMENTS

| | | | | |
|---|---|---|---|---|
| 5,763,820 A * | 6/1998 | Philpot | ............... | B60R 21/2644 102/282 |
| 5,944,342 A * | 8/1999 | White, Jr. | ............... | B60R 21/23 280/729 |
| 6,086,092 A * | 7/2000 | Hill | ............... | B60R 21/233 280/729 |
| 6,106,000 A * | 8/2000 | Stewart | ............... | B60R 21/20 280/728.2 |
| 6,648,366 B2 * | 11/2003 | Dillon | ............... | B60R 21/2346 280/729 |
| 7,195,273 B2 * | 3/2007 | Lewis | ............... | B60R 21/2176 280/728.2 |
| 7,398,992 B2 * | 7/2008 | Marriott | ............... | B60R 21/231 280/729 |
| 7,445,238 B2 * | 11/2008 | Marriott | ............... | B60R 21/217 280/729 |
| 7,618,060 B2 * | 11/2009 | Harvey | ............... | B60R 21/2346 280/728.2 |
| 8,408,582 B2 * | 4/2013 | Lunt | ............... | B60R 21/217 280/728.2 |
| 8,622,422 B1 * | 1/2014 | Thomas | ............... | B60R 21/231 280/730.2 |
| 8,622,423 B1 * | 1/2014 | Manire | ............... | B60R 21/2171 280/730.2 |
| 2003/0201628 A1 * | 10/2003 | Roychoudhury | ..... | B60R 21/231 280/729 |

(Continued)

FOREIGN PATENT DOCUMENTS

KR    10-0286983    4/2001

*Primary Examiner* — Darlene P Condra
(74) *Attorney, Agent, or Firm* — H.C. Park & Associates, PLC

(57) ABSTRACT

A driver airbag structure including: a front panel; a rear panel facing the front panel, and having an edge that is coupled to an edge of the front panel; and an inflator wrap which provides a space that is initially filled with gas when the airbag is deployed. The inflator wrap is provided in the front panel and the rear panel and has both ends that are fixed to both of the front panel and the rear panel.

9 Claims, 7 Drawing Sheets

(56) References Cited

U.S. PATENT DOCUMENTS

| | | | | |
|---|---|---|---|---|
| 2011/0018244 A1* | 1/2011 | Schindzielorz | ....... | B60R 21/231 280/743.1 |
| 2013/0307254 A1* | 11/2013 | Yamaji | ................ | B60R 21/233 280/729 |
| 2014/0138939 A1* | 5/2014 | Scott | ................ | B60R 21/207 280/736 |
| 2014/0265262 A1* | 9/2014 | Witt, Jr. | ................ | B60R 21/261 280/728.2 |
| 2015/0251623 A1* | 9/2015 | Fujiwara | ............... | B60R 21/207 280/728.2 |

* cited by examiner

DRIVER AIRBAG STRUCTURE

CROSS-REFERENCE TO RELATED APPLICATION

This application claims priority from and the benefit of Korean Patent Application No. 10-2014-0169538, filed on Dec. 1, 2014, which is hereby incorporated by reference for all purposes as if fully set forth herein.

BACKGROUND

Field

Exemplary embodiments relate to a driver airbag structure capable of preventing a backslap phenomenon, in which an airbag hits a face of a driver, by decreasing a degree of deployment of the airbag in a direction directly toward a front side of the driver, and increasing a degree of deployment of the airbag in a horizontal direction when the driver airbag is deployed.

Discussion of the Background

In general, various safety devices are provided in a vehicle for the safety of occupants in the vehicle. Among the safety devices of the vehicle, a driver airbag ("DAB") protects a driver from impact at the time of a vehicle collision. The airbag includes a front panel, a rear panel, and an inflator wrap that is installed in the front panel and the rear panel. The airbag inflator wrap is fixed only by sewing it to the rear panel. The inflator wrap serves to protect the front panel. The inflator wrap prevents damage, such as a pinhole, that may be formed when small and fine ash and impurities discharged from an inflator come into direct contact with the front panel. Even though the ash and impurities discharged from the inflator primarily come into contact with the inflator wrap, and then only secondarily come into contact with the front panel, the temperature and energy thereof are decreased while primarily coming into contact with the inflator wrap, such that there is no damage to the front panel.

However, in the driver airbag disclosed in related art Korean Patent No. 10-0286983, the inflator wrap serves only to protect the front panel, and does not serve to guide the gas that is supplied into the airbag to deploy the airbag. As a result, when the driver airbag is deployed excessively forward, that is, in a direction directly toward the driver, the driver may be injured as a result of a backslap phenomenon in which the airbag hits a face of the driver.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a driver airbag structure capable of preventing a backslap phenomenon in which an airbag hits a face of a driver, by decreasing a degree of deployment of the airbag in a direction directly toward a front side of the driver, and increasing a degree of deployment of the airbag in a horizontal direction when the driver airbag is deployed.

Additional aspects will be set forth in the detailed description which follows, and, in part, will be apparent from the disclosure, or may be learned by practice of the inventive concept.

An exemplary embodiment discloses a driver airbag structure including: a front panel; a rear panel facing the front panel and having an edge coupled to an edge of the front panel; and an inflator wrap that provides a space that is initially filled with gas when the airbag is deployed. The inflator wrap is provided in the front panel and the rear panel and has both ends fixed to both of the front panel and the rear panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
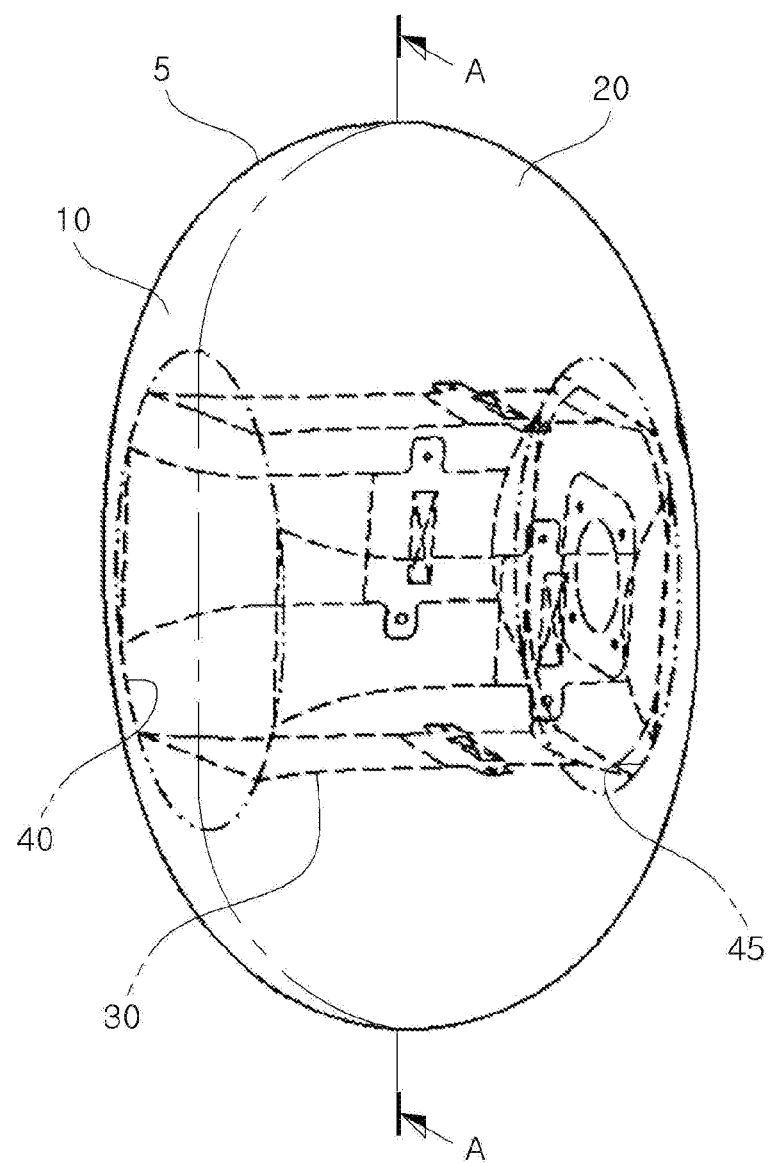
FIG. 1 is a phantom perspective view illustrating a driver airbag structure according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of various elements may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements or components, these elements or components should not be limited by these terms. These terms are used to distinguish one element or component from another element or component. Thus, a first element or component discussed below could be termed a second element or component without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
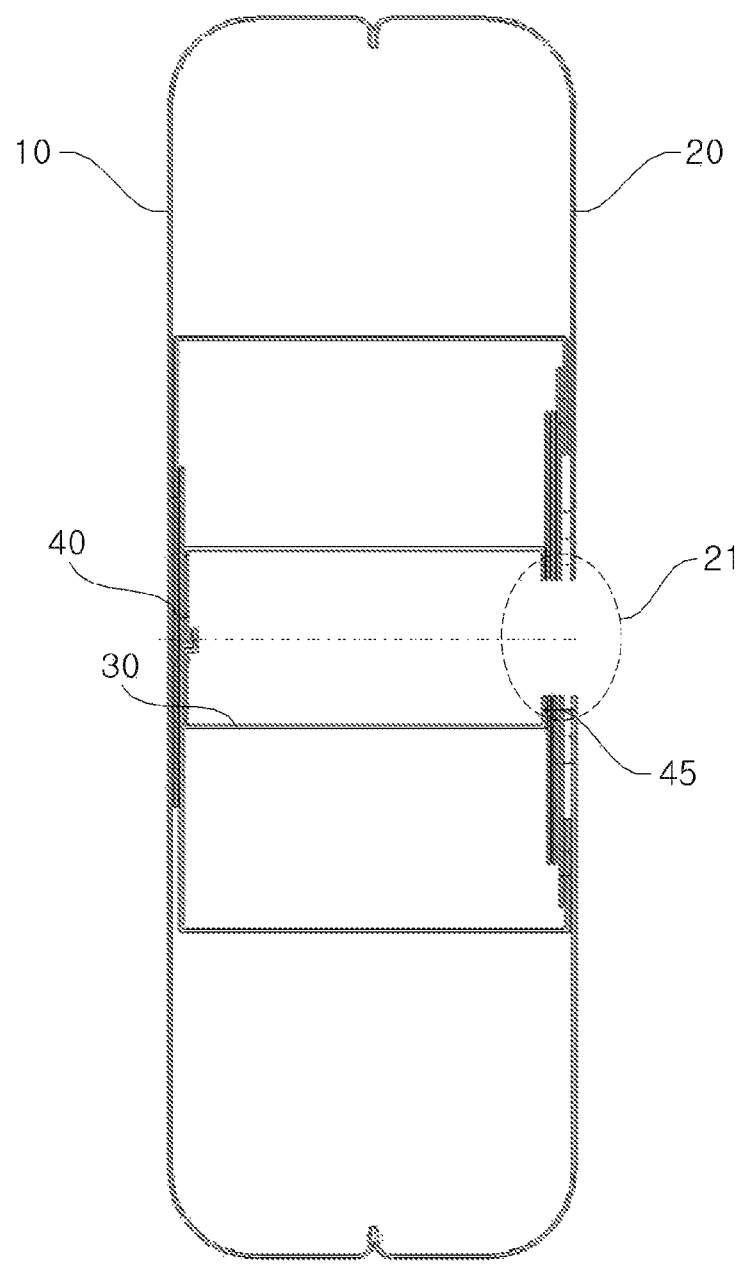
FIG. 2 is a cross-sectional view taken along line A-A of FIG. 1.

As illustrated in FIGS. 1 and 2, a driver airbag structure 5 according to an exemplary embodiment of the present invention includes a front panel 10, a rear panel 20 which has an edge that is sewed corresponding to an edge of the front panel 10, and an inflator wrap 30 which is provided in the front panel 10 and the rear panel 20.

Both ends of the inflator wrap 30 are coupled by sewing in the front panel 10 and the rear panel 20. One side of the inflator wrap 30 is coupled by a first sewed portion 40 to the front panel 10. The other side of the inflator wrap 30 is coupled by second sewed portion 45 to the rear panel 20.

As described above, both sides of the inflator wrap 30 are fixed by the first and second sewed portions 40, 45 on both of the front panel 10 and the rear panel 20, such that it is possible to guide a discharge direction of gas to left and right sides of a driver instead of a direction toward a front side of the driver when a driver airbag is deployed. The gas discharged in left and right directions allows an airbag cushion to be preferentially unfolded in the left and right directions, thereby increasing a degree of left and right deployment of the airbag cushion.

For example, the inflator wrap 30 guides gas in a state in which the inflator wrap 30 is fixed to both of the front panel 10 and the rear panel 20 at the initial time of deployment of the airbag (less than 8 ms), and after 8 ms, the inflator wrap 30 is naturally torn to form a deployment shape of the airbag.

Figure 3:
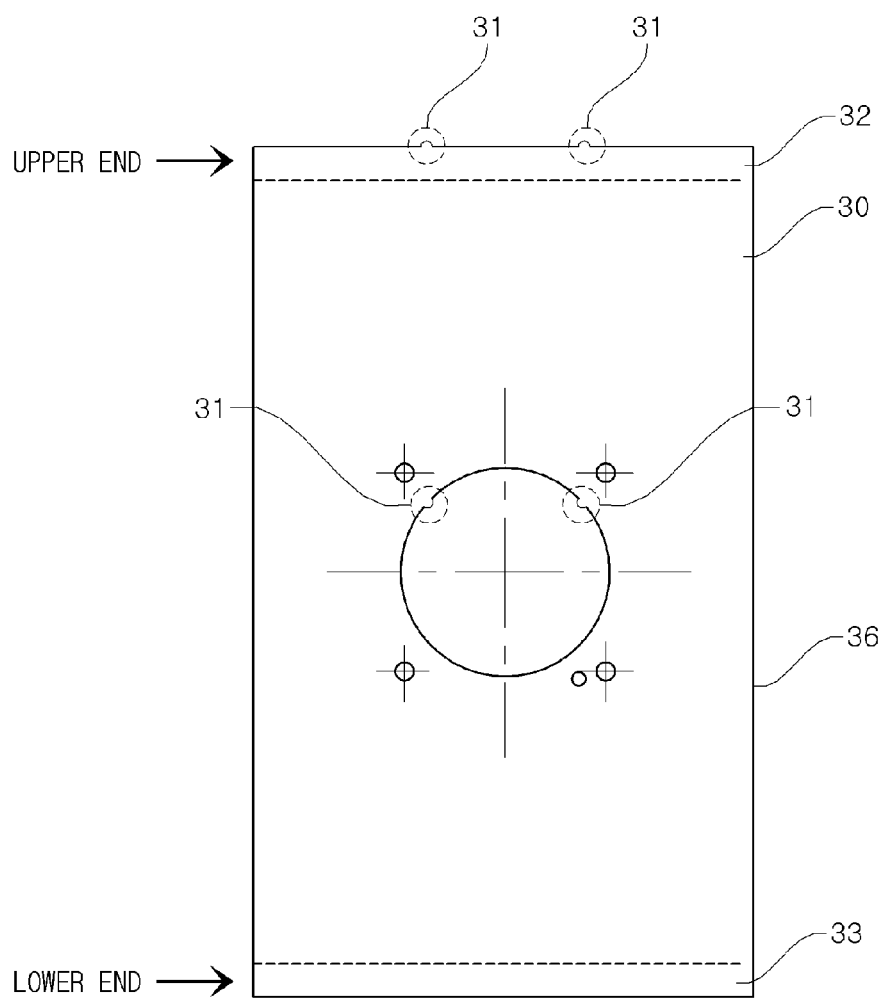
FIG. 3 is a view illustrating a state in which an inflator wrap according to the exemplary embodiment of the present invention is provided as an individual item.
Figure 4:
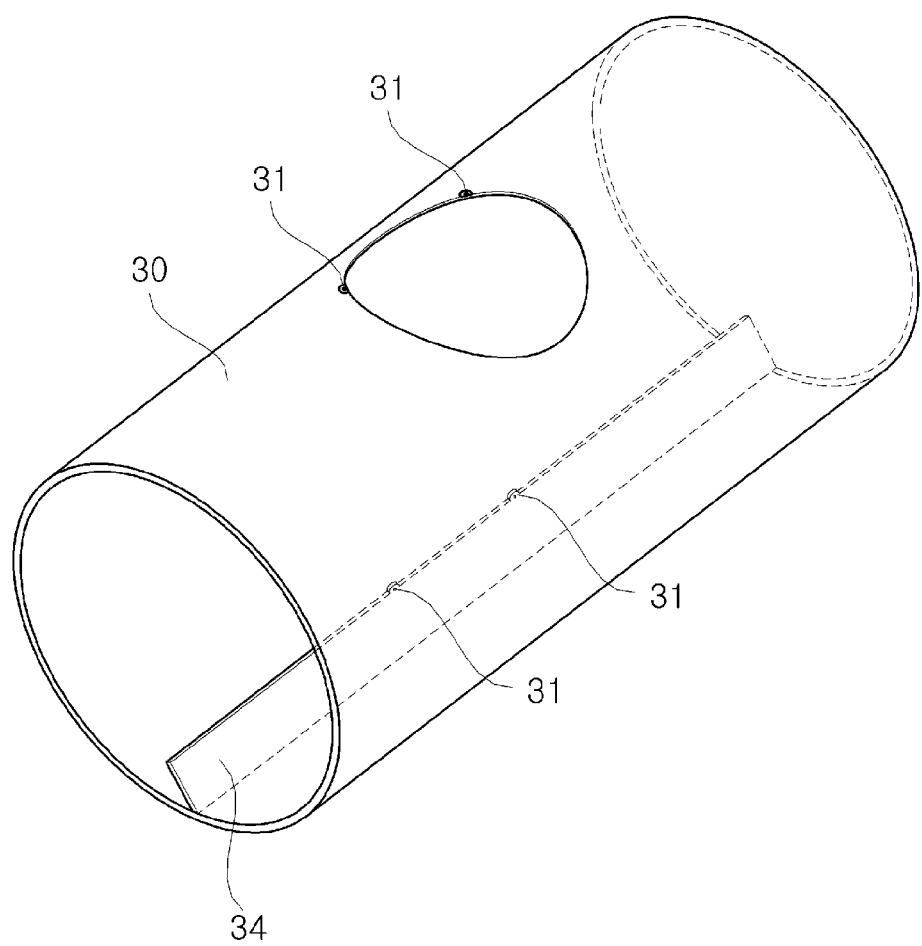
FIG. 4 is a view illustrating a state in which an upper end and a lower end of the inflator wrap according to the exemplary embodiment of the present invention are sewed together.

When the inflator wrap 30 is unfolded, the inflator wrap 30 may have a shape as illustrated in FIG. 3. The inflator wrap 30 includes a main body 36, an upper end 32 which defines an upper portion of the main body 36, and a lower end 33 which defines a lower portion of the main body 36. Centering guides 31 are provided at the upper end 32 and a portion immediately above a center of the main body 36. FIG. 3 illustrates the centering guides 31 that are configured as four points, but the present invention is not limited thereto. As illustrated in FIG. 4, when the upper end 32 and the lower end 33 of the inflator wrap 30 are engaged by sewing, the centering guides 31 come into line with guide points 22 provided at the rear panel 20.

Next, a method of sewing the inflator wrap provided in the front panel and the rear panel will be described with reference to FIG. 2.

The inflator wrap 30, which is provided in the front panel 10 and the rear panel 20, is drawn out through a mouth 21 of the rear panel 20. The upper end 32 and the lower end 33 of the inflator wrap 30, which is drawn out, are engaged by sewing, and then the inflator wrap 30 is placed back into the airbag cushion, that is, the inside of the front panel 10 and the rear panel 20 through the inflator mouth 21. The inflator mouth 21 is a portion through which gas is supplied.

Meanwhile, the inflator wrap 30 is sewed via first sewed portion 40 on the front panel 10 along a circle of having a diameter of about 34 mm after a center of the front panel 10 and a center of the rear panel 20 come into line with each other.

To this end, the centering guides 31 are formed on the inflator wrap 30, as illustrated in FIGS. 3 and 4. The centering guide 31 may have a semi-circular shape. The centering guides 31 may be configured as four points.

Due to the nature of the inflator wrap 30, it is difficult to center the inflator wrap 30 because the inflator wrap 30 may be moved in the front panel 10 and the rear panel 20 except for portions that are fixed to the mouth 21. For this reason, two points of the four points come in line with each other at one time using the centering guides 31 provided on the inflator wrap 30. Then, the inflator wrap 30 is naturally placed at the center of each of the front panel 10 and the rear panel 20.

Figure 5A:
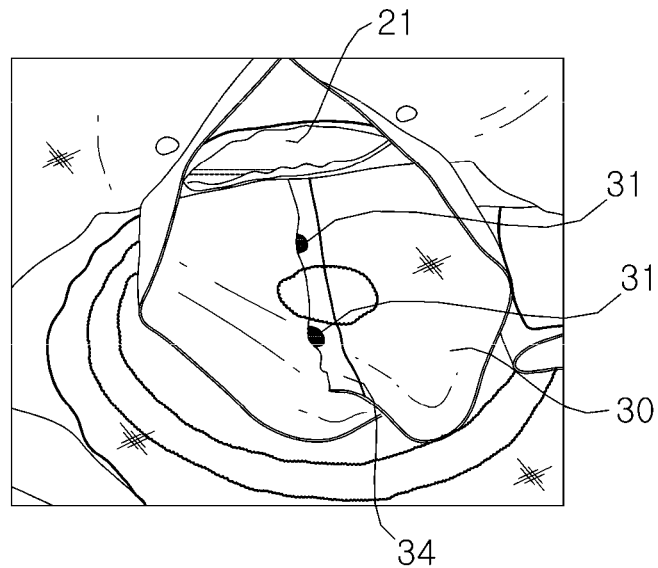
FIG. 5A, FIG. 5B, and FIG. 5C are views illustrating a centering process using a centering guide of the inflator wrap according to the exemplary embodiment of the present invention.
Figure 5B:
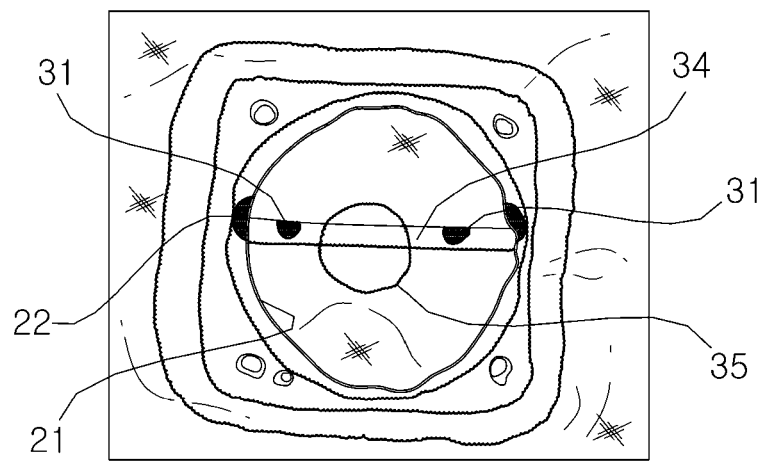
Figure 5C:
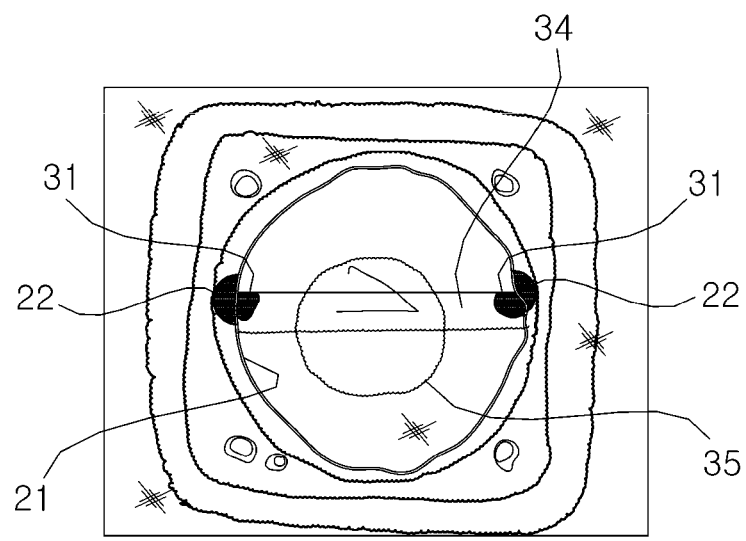

Specifically, when a folded portion 34 of the inflator wrap 30 is sewed, the two centering guides 31, which are positioned on the folded portion 34 among the centering guides 31 of the inflator wrap 30, come into line with the two guide points 22 disposed outside the mouth 21 of the rear panel 20, as illustrated in FIGS. 5A-5C. Therefore, the inflator wrap 30 is naturally placed at the center of each of the front panel 10 and the rear panel 20.

Figure 6:
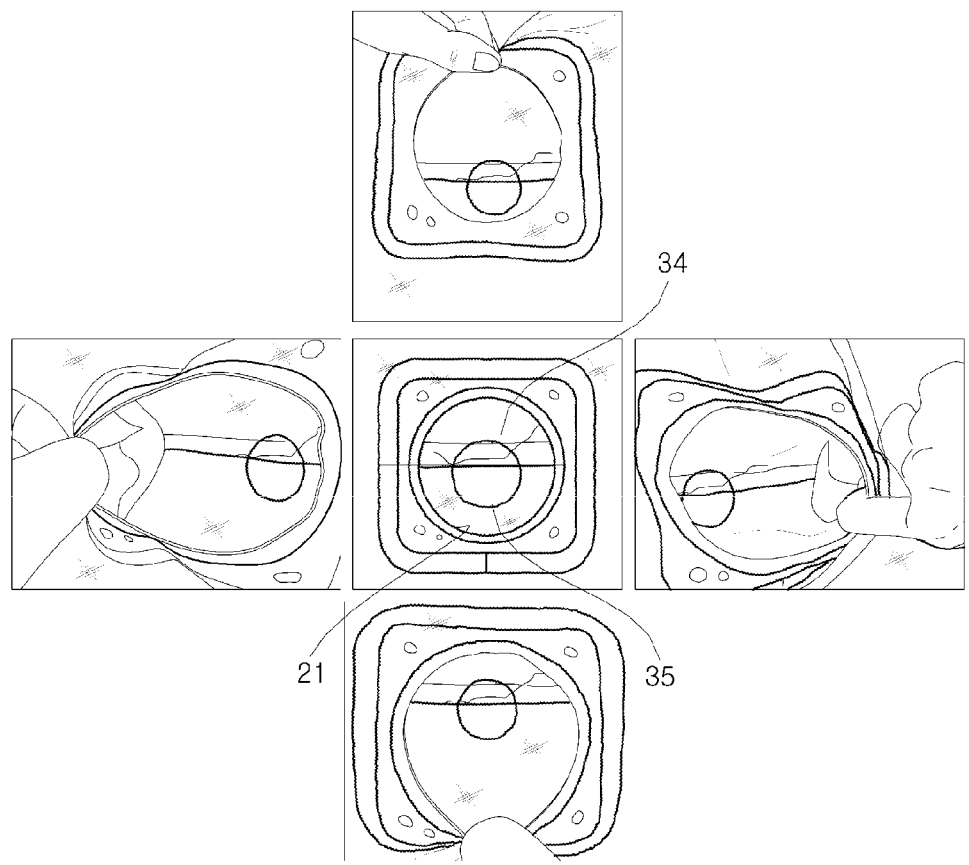
FIG. 6 is a view illustrating a process of sewing the inflator wrap according to the exemplary embodiment of the present invention.

After centering the inflator wrap 30 as described above, the rear panel 20 is directed upward and placed on a flat surface as illustrated in FIG. 6, and one end of the inflator wrap 30, which is exposed to the mouth 21, is folded to form the folded portion 34, and thereafter, the front panel 10 is reversed to be directed upward and placed on the flat surface, and then sewing in a circular manner 35 is performed along a circle having a diameter of about 35 mm. The circularly sewed portion 35 includes the folded portion 34. The folded portion 34 may be a sewed portion where the upper end 32 and the lower end 33 of the inflator wrap 30 engage with each other.

The reason why the sewing in a circular manner 35 is performed is that when the airbag cushion expands such that the inflator wrap 30 is pulled by the expansion, the sewing needs to be performed in a circular manner without forming an angled portion in order to prevent damage to the front panel 10. In addition, as a sewing type, a single needle lock (Needle 138, Robbin 138, Stitch Count: 9±1/25 mm) may be applied. Meanwhile, force, which maintains the sewed portion, is greater than strength that damages the inflator wrap 30. Therefore, as illustrated in FIG. 6, gas charged through the mouth 21 is guided by gas pressure through holes at one side of the inflator wrap 30 which is torn except for the sewed portion, and then supplied into the inflator wrap 30.

Meanwhile, the present invention was compared with the related art through experiments in terms of a degree of front deployment and a degree of left and right deployment at the initial time (@7 ms) of deployment. The present invention was also compared with the related art in terms of a deployment shape when the airbag is fully deployed (@30 ms). The present invention was also compared with the related art in terms of deployment properties by an LRD test (chin on rim position) according to a regulation in North America (@11 ms). As a result, it could be seen that according to the driver airbag according to the exemplary embodiment of the present invention, when the airbag is deployed, a degree of deployment of the airbag in a direction directly toward the front side of the driver is decreased, and a degree of deployment of the airbag in a horizontal direction is increased in comparison with the airbag in the related art. In addition, it could be seen that according to the driver airbag according to the exemplary embodiment of the present invention, a degree of front deployment of the airbag is decreased at the initial time (less than 12 ms) of deployment of the airbag. In addition, it could be seen that a degree of left and right deployment of the airbag is increased, thereby improving LRD (chin on rim position) injury characteristics. In addition, according to the driver airbag according to the exemplary embodiment of the present invention, the deployment properties after 12 ms are the same as those of a basic airbag to be compared, thereby ensuring equal performance in other collision performance tests.

As described above, the driver airbag structure according to the exemplary embodiment of the present invention may prevent a backslap phenomenon in which the airbag hits the face of the driver, by decreasing a degree of deployment of the airbag in a direction toward the front side of the driver, and increasing a degree of deployment of the airbag in a horizontal direction when the driver airbag is deployed.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A driver airbag structure comprising:
   a front panel;
   a rear panel facing the front panel, the rear panel comprising an edge that is coupled to an edge of the front panel; and
   an inflator wrap provided in the front panel and the rear panel and having both ends that are fixed to both of the front panel and the rear panel,
   wherein:
   in an unfolded state, the inflator wrap comprises:
      a main body;
      an upper end which defines an upper portion of the main body; and
      a lower end which defines a lower portion of the main body; and
   in a folded state, the upper end and the lower end of the inflator wrap are directly engaged with each other by sewing to form a folded portion.

2. The driver airbag structure of claim 1, wherein the rear panel further comprises a mouth at a center portion thereof through which gas is supplied when the airbag is deployed.

3. The driver airbag structure of claim 1, wherein when the inflator wrap is sewed, the inflator wrap is configured to be drawn out from the inside of the rear panel through a mouth provided in the rear panel, an upper end and a lower end of the inflator wrap having a flat shape are engaged with each other by sewing, and the inflator wrap is configured to be insertable back into the rear panel through the mouth.

4. The driver airbag structure of claim 1, further comprising a plurality of centering guides at one side of the inflator wrap, the plurality of centering guides are configured to be in alignment with a plurality of guide points provided outside a mouth provided in the rear panel when the upper end and the lower end of the inflator wrap are engaged with each other by sewing.

5. The driver airbag structure of claim 4, wherein the centering guides of the inflator wrap are aligned with the guide points of the rear panel inside the rear panel, and thereafter, sewing in a circular manner, which includes a portion of the inflator wrap exposed through the mouth, and a folded portion of the inflator wrap, is performed.

6. The driver airbag structure of claim 4, the centering guides that are configured as four points.

7. The driver airbag structure of claim 4, the centering guide has a semi-circular shape.

8. The driver airbag structure of claim 1, wherein the inflator wrap is configured to provide a space that is initially filled with gas when the airbag is deployed.

9. The driver airbag structure of claim 1, wherein one side of the inflator wrap is coupled by sewing to the front panel and the other side of the inflator wrap is coupled by sewing to the rear panel.

* * * * *